UNITED STATES PATENT OFFICE.

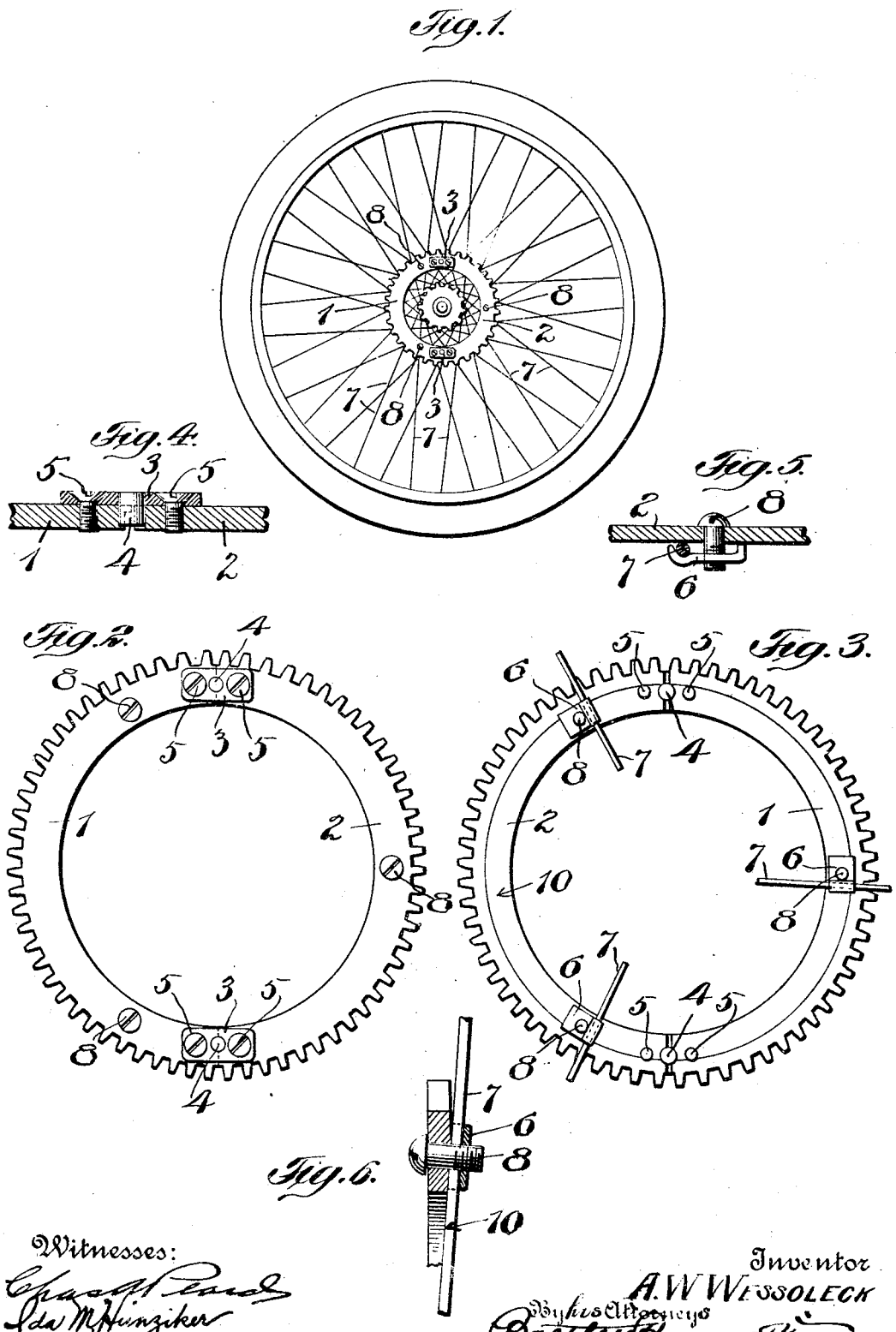

AUGUSTUS W. WESSOLECK, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

DRIVING-GEAR FOR SPEEDOMETERS.

1,067,700.

Specification of Letters Patent.  Patented July 15, 1913.

Application filed November 14, 1912. Serial No. 731,270.

*To all whom it may concern:*

Be it known that I, AUGUSTUS W. WESSOLECK, a citizen of the United States, residing at New Britain, in the county of Hartford and State of Connecticut, have invented certain new and useful Improvements in Driving-Gear for Speedometers, of which the following is a full, clear, and exact description.

My invention relates to an improved driving gear for odometers or speedometers, for use in connection with motor bicycles and the like.

As is well known, the wheels of a motor bicycle are carried between forks of a main supporting frame and are not easily removed. A gear as heretofore constructed cannot be attached thereto without separating the wheel from the frame, and accordingly it is the object of my invention to provide a simple and effective gear construction which may be readily applied to either wheel of a motor bicycle without disturbing the latter in the slightest. Ordinarily in motor bicycles, it is customary to drive a speedometer or cyclometer by the driving wheel instead of by the steering wheel. Since the driving wheel can only be removed by disturbing several carefully predetermined adjustments, the importance and advantages of providing a gear which may be simply and quickly attached without disturbing the wheel in the slightest is very apparent.

In the drawings: Figure 1 represents an outside elevation of the driving wheel of a motor bicycle detached and with my gear affixed thereto. Fig. 2 is a relatively enlarged side elevation of my improved gear, viewed from the outside. Fig. 3 is a similar view of the inside. Figs. 4, 5 and 6 are relatively enlarged detailed views, mainly in section.

The gear proper comprises a ring made up of at least two separable segmental sections 1 and 2, which sections when connected together make a complete gear. These sections are separated at suitable points, the line of each separation preferably occurring at the bottom of a notch between two adjacent teeth.

3—3 are coupling blocks or bridging devices by which the adjacent ends of the gear sections may be connected. Each of these blocks 3 is provided with a centering pin 4 and each end of each section is respectively provided on the inner face of the gear sections with a semi-circular notch arranged to snugly receive one-half of its centering pin.

5—5 are fastening screws by which the coupling member 3 may be connected to the gear sections 1—2. Suitable clips 6 may be attached to attach the gear sections to the spokes 7—7 of the wheel. In this particular instance, the clips 6 are controlled by clamping screws 8 which pass through the gear sections and by which means the clips are securely clamped to the spokes 7—7. The inner face of the gear sections is beveled back as indicated at 10 to approximately conform to the incline of the spokes 7 and so as to give a proper bearing. When it is desired to apply a gear to the wheel the two sections 1—2 are opened or separated and brought together between the bicycle frame and the outside of the bicycle wheel. The coupling members 3—3 are then successively applied, the screws 5 being employed to connect the coupling member 3 to the two adjacent ends of said sections. The function of the centering pin 4 is to accurately position the adjacent ends of the gear sections so that the gear teeth thereon will mesh properly with the other gear (not shown) to be driven thereby.

When the parts are assembled and the screws 5—5 are set up tightly, the gear sections are rigidly held in operative position and may then be applied to the spokes 7. This application may be easily and quickly effected by means of the clips 6 and the co-operating clamping screws 8 aforesaid. The application of the gear to such a wheel may be easily and quickly effected and although the gear is made up of separate sections, all of said sections are bound to be united properly for coöperation with the pinion to be driven thereby.

I have described herein only the specific embodiment or form of my invention which the drawings illustrate which, it should be understood, is a preferred form only, and that various modifications and arrangements of parts may be resorted to without departure from the spirit of said invention or the scope of the following claims.

What I claim is:

1. A gear of the character described, comprising at least two separate sections, coupling devices for securing together the ends of said sections with means for centering the connected ends to properly position the gear teeth thereon respectively, said centering means being carried by said coupling means.

2. A gear of the character described, comprising at least two separate sections, coupling devices for securing together the ends of said sections with means for centering the connected ends to properly position the gear teeth thereon respectively, and means for coupling the assembled gear to a wheel element.

3. A gear of the character described, comprising at least two separate sections, coupling devices for securing together the ends of said sections with means for centering the connected ends to properly position the gear teeth thereon respectively, said centering means being carried by said coupling means, and means carried by said gear for coupling the assembled sections thereof to the spoke of a wheel element.

AUGUSTUS W. WESSOLECK.

Witnesses:
JOHN HERBERT ANNEAR,
HERBERT BROWNE.